United States Patent [19]

Kyriakos et al.

[11] Patent Number: 4,503,401

[45] Date of Patent: Mar. 5, 1985

[54] WIDEBAND PHASE LOCKED LOOP TRACKING OSCILLATOR FOR RADIO ALTIMETER

[75] Inventors: Constantinos S. Kyriakos, Deerfield Beach; Dean S. Maurer, Lighthouse Pt.; Louis J. Millio, Ft. Lauderdale, all of Fla.

[73] Assignee: Allied Corporation, Morristown, N.J.

[21] Appl. No.: 404,946

[22] Filed: Aug. 4, 1982

[51] Int. Cl.³ .................... H03L 7/08; H03L 7/10; G01S 13/08; H03B 23/00
[52] U.S. Cl. ........................................ 331/4; 331/16; 331/17; 331/36 C; 331/179; 343/12 A
[58] Field of Search .............. 331/4, 16, 17, 25, 36 R, 331/36 C, 179; 343/12 A

[56] References Cited

U.S. PATENT DOCUMENTS

| | | | |
|---|---|---|---|
| 4,156,205 | 5/1979 | Kadin et al. | 331/36 C X |
| 4,262,264 | 4/1981 | Vandegraaf | 331/4 |
| 4,305,045 | 12/1981 | Metz et al. | 331/1 A |
| 4,330,758 | 5/1982 | Swisher et al. | 331/16 X |
| 4,375,693 | 3/1983 | Kuhn | 331/4 X |

Primary Examiner—Eugene R. Laroche
Assistant Examiner—D. C. Mis
Attorney, Agent, or Firm—Bruce L. Lamb; Robt. M. Trepp

[57] ABSTRACT

A wideband phase locked loop oscillator (PLLO) for tracking the frequency of an altitude signal in an FM/CW type radio altimeter. The phase locked loop oscillator conventionally includes a voltage controlled oscillator (VCO), a phase comparator for comparing the phase of the altitude signal to be tracked with the phase of the VCO output and an error signal amplifier for applying the output of the phase comparator as control voltage to the VCO. The frequency range of the PLLO is extended by changing the natural frequency of the VCO in steps spanning the useful frequency range of the altitude signal. Selection of the proper value of VCO natural frequency is effected through microprocessor directed digital control.

13 Claims, 13 Drawing Figures

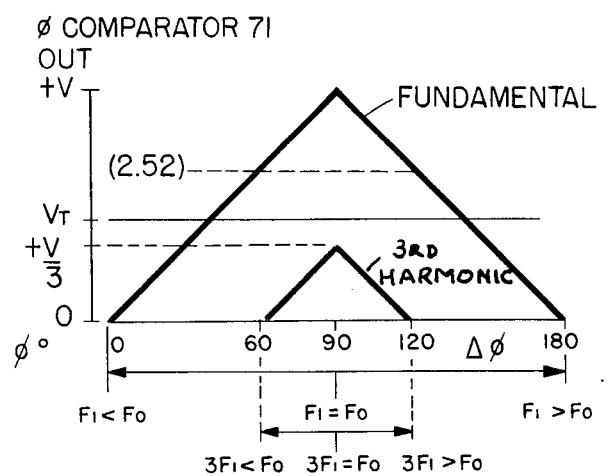
FIG. 4B
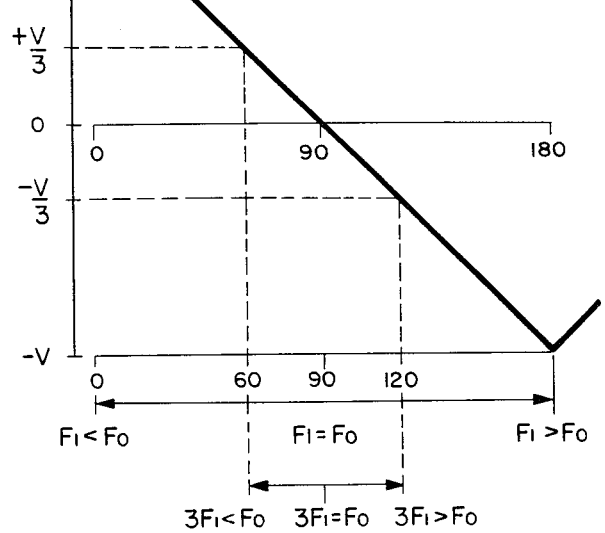
FIG. 4A
FIG. 5A
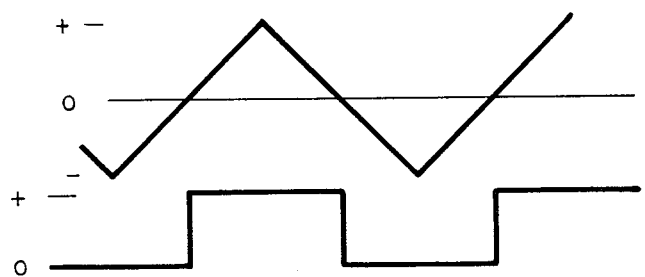
FIG. 5B
FIG. 5C

| Index | (DB1) | (DB0) | DB7 | DB6 | DB5 | DB4 | DB3 | DB2 | DB1 | DB0 | Co mf. | Csw pf. | Fo KHz | Fc Low KHz | Fc High KHz |
|---|---|---|---|---|---|---|---|---|---|---|---|---|---|---|---|
| 0 | 0 | 0 | 0 | 0 | 0 | 0 | 0 | 0 | 0 | 0 | .1887 | 4540 | 1.2 | 1.01 | 1.39 |
| 1 | 0 | 0 | 0 | 0 | 0 | 0 | 0 | 0 | 0 | 0 | .1887 | 4540 | 1.2 | 1.01 | 1.39 |
| 2 | 0 | 0 | 1 | 0 | 0 | 1 | 1 | 0 | 0 | 0 | .1635 | 4540 | 1.39 | 1.18 | 1.59 |
| 3 | 0 | 0 | 1 | 0 | 0 | 1 | 1 | 0 | 0 | 0 | .1635 | 4540 | 1.39 | 1.18 | 1.59 |
| 4 | 0 | 1 | 0 | 0 | 1 | 1 | 1 | 1 | 0 | 1 | .1332 | 4070 | 1.73 | 1.43 | 2.00 |
| 5 | 0 | 1 | 0 | 0 | 1 | 1 | 1 | 1 | 0 | 1 | .1332 | 4070 | 1.73 | 1.43 | 2.00 |
| 6 | 0 | 1 | 1 | 1 | 0 | 0 | 0 | 1 | 0 | 1 | .10912 | 2740 | 2.15 | 1.76 | 2.65 |
| 7 | 0 | 1 | 1 | 1 | 0 | 0 | 0 | 1 | 0 | 1 | .10912 | 2740 | 2.15 | 1.76 | 2.65 |
| 8 | 1 | 0 | 0 | 0 | 1 | 1 | 1 | 0 | 1 | 0 | .08058 | 2270 | 2.81 | 2.25 | 3.40 |
| 9 | 1 | 0 | 0 | 0 | 1 | 1 | 1 | 0 | 1 | 0 | .08058 | 2270 | 2.81 | 2.25 | 3.40 |
| 10 | 1 | 0 | 1 | 0 | 0 | 1 | 1 | 0 | 1 | 0 | .06328 | 2740 | 3.61 | 2.90 | 4.46 |
| 11 | 1 | 0 | 1 | 0 | 0 | 1 | 1 | 0 | 1 | 0 | .06328 | 2740 | 3.61 | 2.90 | 4.46 |
| 12 | 1 | 0 | 1 | 1 | 1 | 0 | 0 | 1 | 1 | 0 | .05131 | 2270 | 4.51 | 3.64 | 5.63 |
| 13 | 1 | 0 | 1 | 1 | 1 | 0 | 0 | 1 | 1 | 0 | .05131 | 2270 | 4.51 | 3.64 | 5.63 |
| 14 | 1 | 1 | 0 | 0 | 0 | 1 | 1 | 1 | 1 | 1 | .0377 | 2740 | 6.07 | 4.90 | 7.61 |
| 15 | 1 | 1 | 0 | 0 | 0 | 1 | 1 | 1 | 1 | 1 | .0377 | 2740 | 6.07 | 4.90 | 7.61 |
| 16 | 1 | 1 | 0 | 1 | 0 | 0 | 1 | 0 | 0 | 1 | .03059 | 2740 | 7.5 | 6.13 | 9.53 |
| 17 | 1 | 1 | 0 | 1 | 1 | 1 | 0 | 0 | 0 | 0 | .0248 | 2270 | 9.47 | 7.81 | 12.71 |
| 18 | 1 | 1 | 1 | 0 | 0 | 0 | 1 | 0 | 1 | 0 | .01848 | 2740 | 12.38 | 10.10 | 15.84 |
| 19 | 1 | 1 | 1 | 0 | 1 | 0 | 0 | 0 | 1 | 1 | .01467 | 2270 | 15.88 | 13.07 | 20.44 |
| 20 | 1 | 1 | 1 | 0 | 1 | 1 | 0 | 1 | 1 | 1 | .0120 | 2270 | 19.92 | 16.52 | 25.97 |
| 21 | 1 | 1 | 1 | 1 | 0 | 0 | 0 | 0 | 0 | 1 | .00959 | 940 | 23.21 | 18.67 | 28.98 |
| 22 | 1 | 1 | 1 | 1 | 0 | 0 | 1 | 1 | 1 | 1 | .0079 | 940 | 28.38 | 22.90 | 35.81 |
| 23 | 1 | 1 | 1 | 1 | 0 | 1 | 1 | 0 | 0 | 1 | .00639 | 940 | 35.29 | 28.93 | 44.73 |
| 24 | 1 | 1 | 1 | 1 | 1 | 0 | 0 | 0 | 0 | 0 | .0050 | 470 | 44.00 | 35.38 | 53.87 |
| 25 | 1 | 1 | 1 | 1 | 1 | 0 | 0 | 1 | 1 | 1 | .0042 | 470 | 52.74 | 42.65 | 65.06 |
| 26 | 1 | 1 | 1 | 1 | 1 | 0 | 1 | 1 | 0 | 0 | .00353 | 470 | 62.55 | 50.98 | 76.88 |
| 27 | 1 | 1 | 1 | 1 | 1 | 0 | 1 | 1 | 1 | 1 | .0032 | 470 | 69.33 | 56.87 | 84.74 |
| 28 | 1 | 1 | 1 | 1 | 1 | 1 | 0 | 0 | 1 | 0 | .00258 | 470 | 83.68 | 69.34 | 99.99 |
| 29 | 1 | 1 | 1 | 1 | 1 | 1 | 0 | 1 | 1 | 0 | .0021 | 470 | 102.57 | 83.46 | 123.74 |
| 30 | 1 | 1 | 1 | 1 | 1 | 1 | 1 | 0 | 0 | 0 | .0018 | 470 | 116.96 | 94.91 | 142.21 |
| 31 | 1 | 1 | 1 | 1 | 1 | 1 | 1 | 0 | 1 | 1 | .00147 | 470 | 142.09 | 117.23 | 164.68 |
| 32 | 1 | 1 | 1 | 1 | 1 | 1 | 1 | 1 | 0 | 1 | .00122 | 470 | 170.24 | 137.46 | 205.23 |
| 33 | 1 | 1 | 1 | 1 | 1 | 1 | 1 | 1 | 1 | 1 | .0010 | 470 | 205.17 | 166.88 | 236.01 |

FIG. 6

WIDEBAND PHASE LOCKED LOOP TRACKING OSCILLATOR FOR RADIO ALTIMETER

The present invention relates generally to FM/CW Radio Altimeters and more particularly to a wide range phase locked loop oscillator having microprocessor control used as a signal conditioner in an FM/CW Radio Altimeter.

FM/CW Radio Altimeters are instruments used in aircraft to determine the actual height of the aircraft above the terrain. The basic principle of operation of these instruments is well known and is described in such references as U.S. Pat. Nos. 2,247,662 and 3,341,849. Very briefly, a frequency modulated continuous wave signal is transmitted from the aircraft toward the ground and the ground reflection of the transmitted signal received at the aircraft is mixed with the outgoing signal to provide an altitude signal, the frequency of which is proportional to aircraft height. The height indication of the aircraft is provided by measuring the frequency of the altitude signal.

Processing of the altitude signal to provide height indication is complicated by the fact that the altitude signal actually comprises a single-sided spectrum of frequencies, the peak component of which accurately represents the aircraft height. In copending U.S. Pat. No. 4,427,981 to C. S. Kyriakos for "Tracking Filter for Radio Altimeter" there is disclosed a filter having variable charactistics controlled as a function of the altitude signal for improved the performance of the altimeter. The present invention provides further improvement in the performance of a radio altimeter by providing a phase locked loop oscillator capable of tracking through a wide frequency range, enabling the oscillator to lock onto the principal component of the output of altimeter tracking filter and thereby provide a clean, single frequency signal which may be counted accurately by the digital signal processor of the altimeter.

In a specific embodiment of the present invention a calibration constant of 80 Hz/ft. was selected. For an altimeter range of 0-2500 ft. the tracking oscillator must be capable of following a signal having a frequency range from about 1 kHz to greater than 200 kHz. A frequency offset exists at zero height since the altimeter antennas are some distance from the ground when the aircraft is resting on the ground. A phase locked loop (PLL) oscillator is capable of capturing or maintaining lock on an input signal having a frequency range of about ±20% of the free natural frequency of the PLL voltage controlled oscillator (VCO). Obviously, the natural frequency of the VCO must be programmed to cover the required range of operation of the tracking oscillator since setting the VCO natural frequency to the lowest input frequency of about 1 kHz would limit the tracking oscillator to a range of about 800 Hz to 1.2 kHz and setting the VCO natural frequency to the highest input frequency limits the tracking oscillator range to between about 160 kHz and 240 kHz.

At the lowest input frequency to the tracking oscillator the VCO natural frequency can only be changed in increments of about 0.2 kHz, while the highest required VCO natural frequency is about 200 kHz. A linear search program would require 1000 increments to cover the operating range of the tracking oscillator. Translated to time, each altimeter program cycle consumes about 25 milliseconds, resulting in a search time which may be 25 seconds in duration with linear programming and which may be several times that amount if validation of data is required. Such a long time for acquisition of an altimeter signal cannot be tolerated in aircraft where descent rates of several thousand feet/minute are not uncommonly encountered.

It is an object of the present invention to provide a tracking oscillator for use in an FM/CW Radio Altimeter which is capable of capturing and tracking a wide range of input signal frequencies.

It is a further object of the invention to provide a phase locked loop type tracking oscillator having fast acting digital tuning control means to provide rapid acquisition of an altitude signal in an FM/CW Radio Altimeter.

It is another object of the invention to provide a PLL tracking oscillator for an FM/CW radio altimeter having digital means for adjusting the oscillator natural frequency when the difference between the oscillator natural frequency and the frequency of the altitude signal being tracked approaches the point where signal lock may be lost.

Other objects and attendant advantages of the invention will become apparent as a complete understanding thereof is gained through study of the following complete description of the accompanying drawings.

Briefly, the invention comprises a phase locked loop oscillator having in integrated circuit form a voltage controlled oscillator, a phase comparator for comparing the phase of the voltage controlled oscillator output with the phase of an applied altitude signal and an error signal amplifier for applying the phase comparator output to the voltage controlled oscillator to vary the frequency thereof. The natural frequency of the voltage controlled oscillator and the bandwidth of the error signal amplifier are determined by external capacitors connected to the integrated circuit through digital control means. The digital control makes use of a look-up table having digital data entries for twenty-five discrete coarse tuning steps in the natural frequency of the voltage controlled oscillator covering the range of about 1-200 kHz, with the data for the lower eight frequency steps being duplicated in adjacent table index rows for a total of thirty-three table index rows. The digital control means employs search and fine tuning program subroutines for the altimeter microprocessor, enabling a frequency search to be conducted through the entire oscillator operating range in a maximum of thirty-three program cycles, the total of which consumes less than one second.

In the drawings:

FIG. 4A is a chart showing error signal voltage variation and phase relationship for different frequencies of applied signal and oscillator natural frequency in a phase locked loop oscillator;

FIG. 4B is a chart similar to FIG. 4A showing the output of a phase comparator having as inputs an applied signal and the output of an oscillator locked in phase to the applied signal and shifted in phase 90°;

FIGS. 5A-5C are waveform diagrams showing, respectively, the output of a phase locked loop oscillator;

Figure 7:
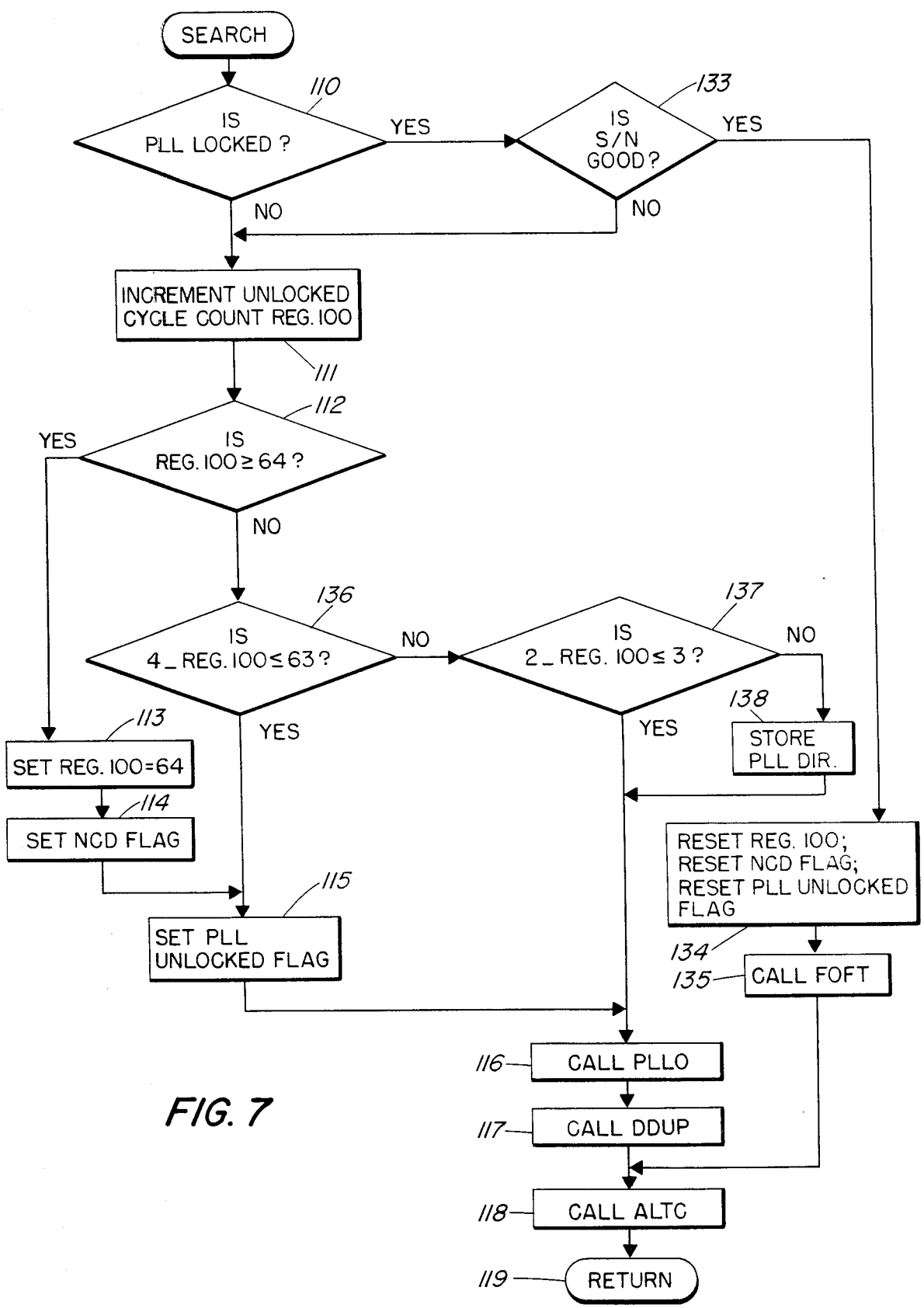
Figure 8:
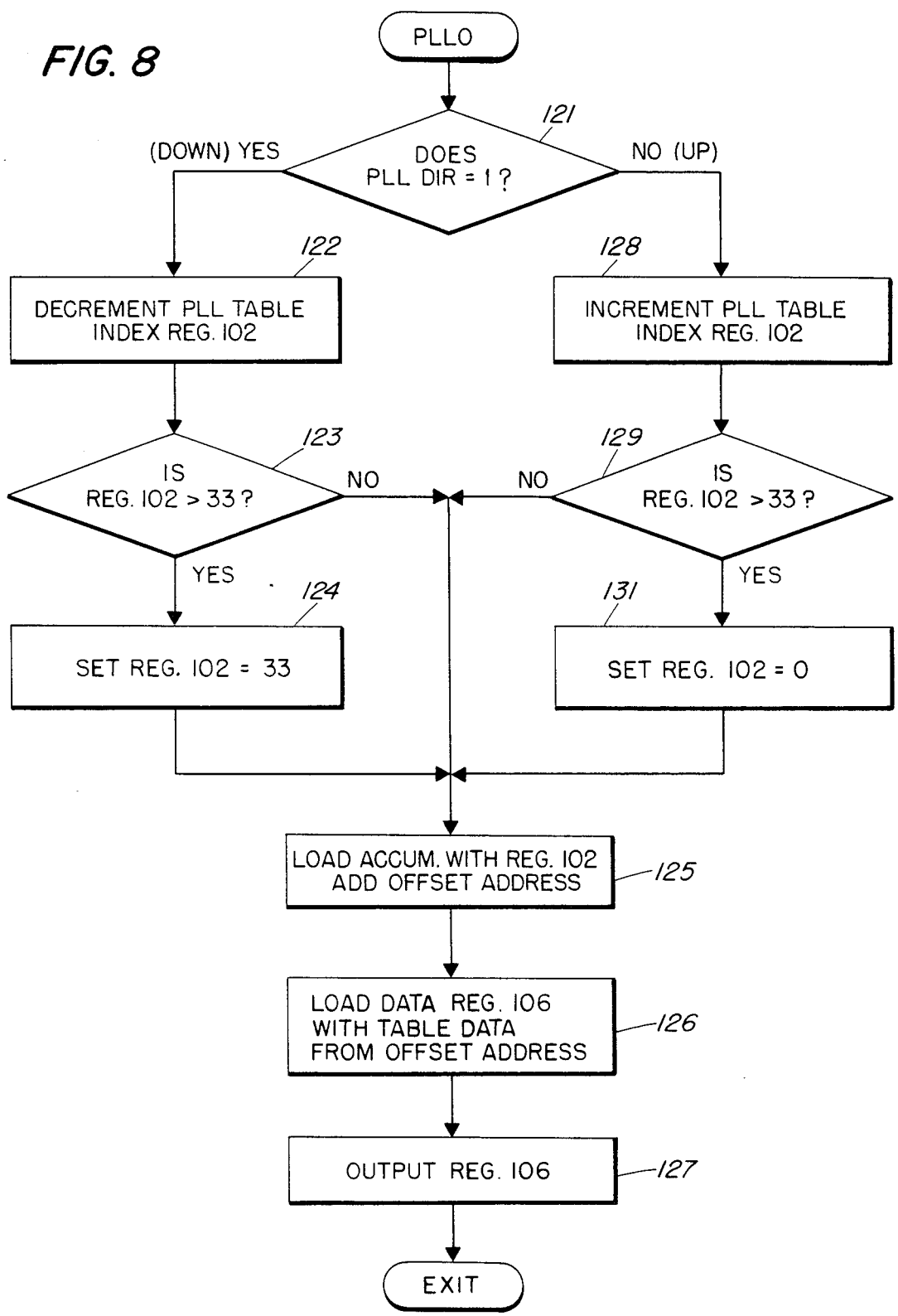
Figure 9A:
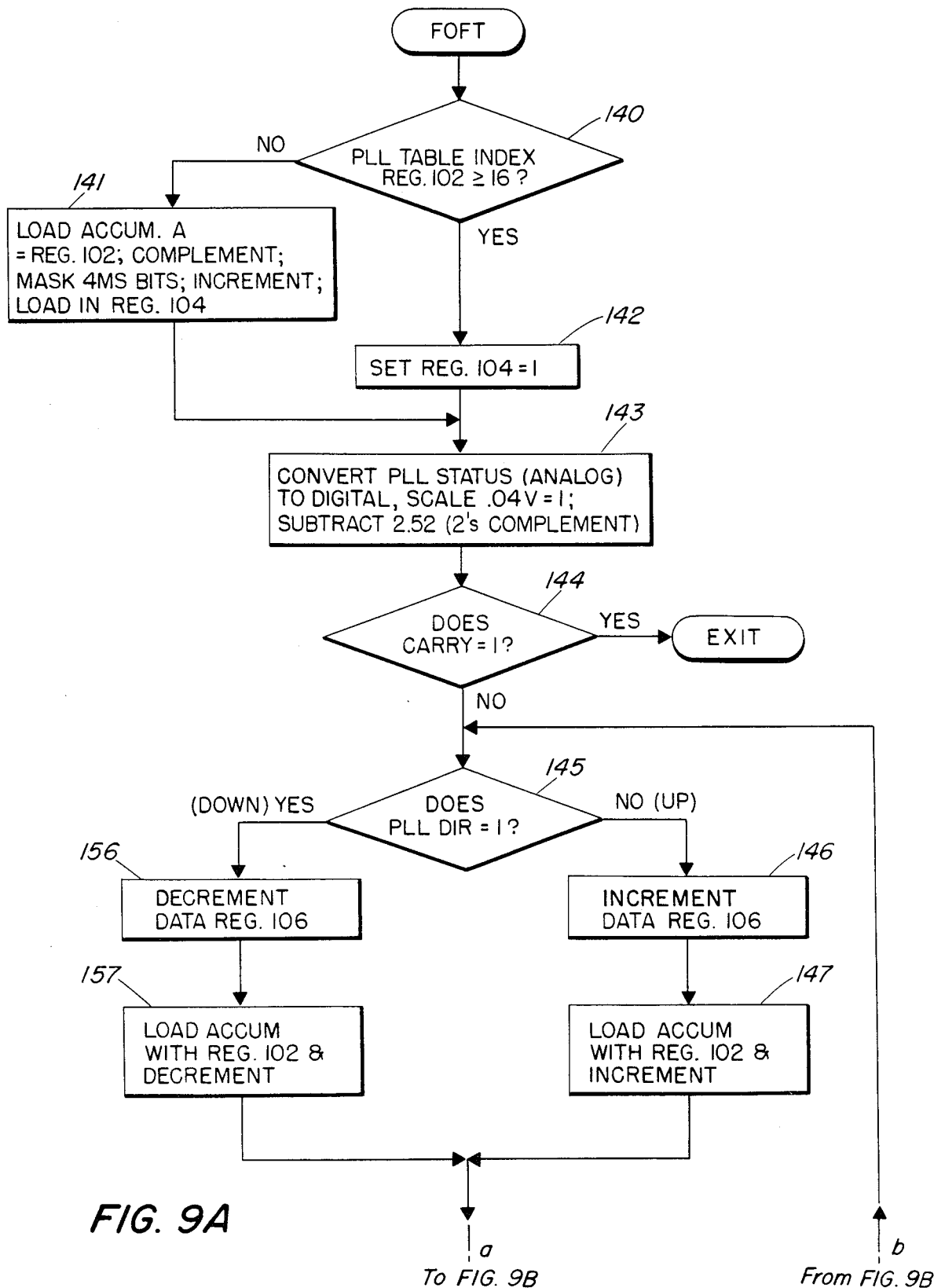
Figure 9B:
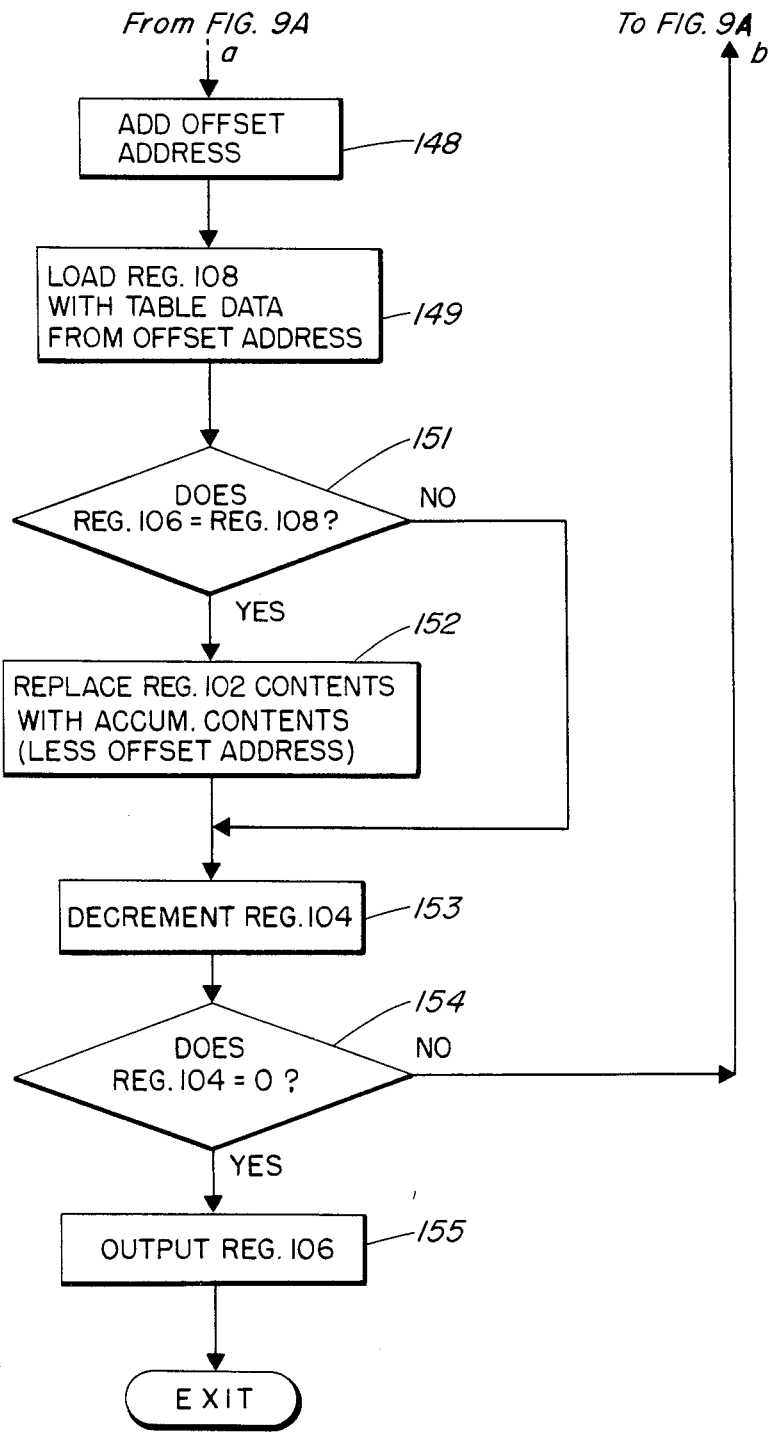

the voltage across the timing capacitor thereof and the oscillator output shifted in phase 90°;

FIG. 6 is a table showing the data stored in microprocessor memory for control of the oscillator of the invention and showing the values of timing capacitor, bandwidth capacitors, oscillator natural frequencies and high and low capture frequencies for the various rows of control data;

FIG. 7 is a flow chart illustrating the SEARCH subroutine used in the invention;

FIG. 8 is a flow chart illustrating the PLLO subroutine used in the invention; and FIGS. 9A and 9B, assembled, is a flow chart illustrating the FOFT subroutine used in the invention.

Figure 1:
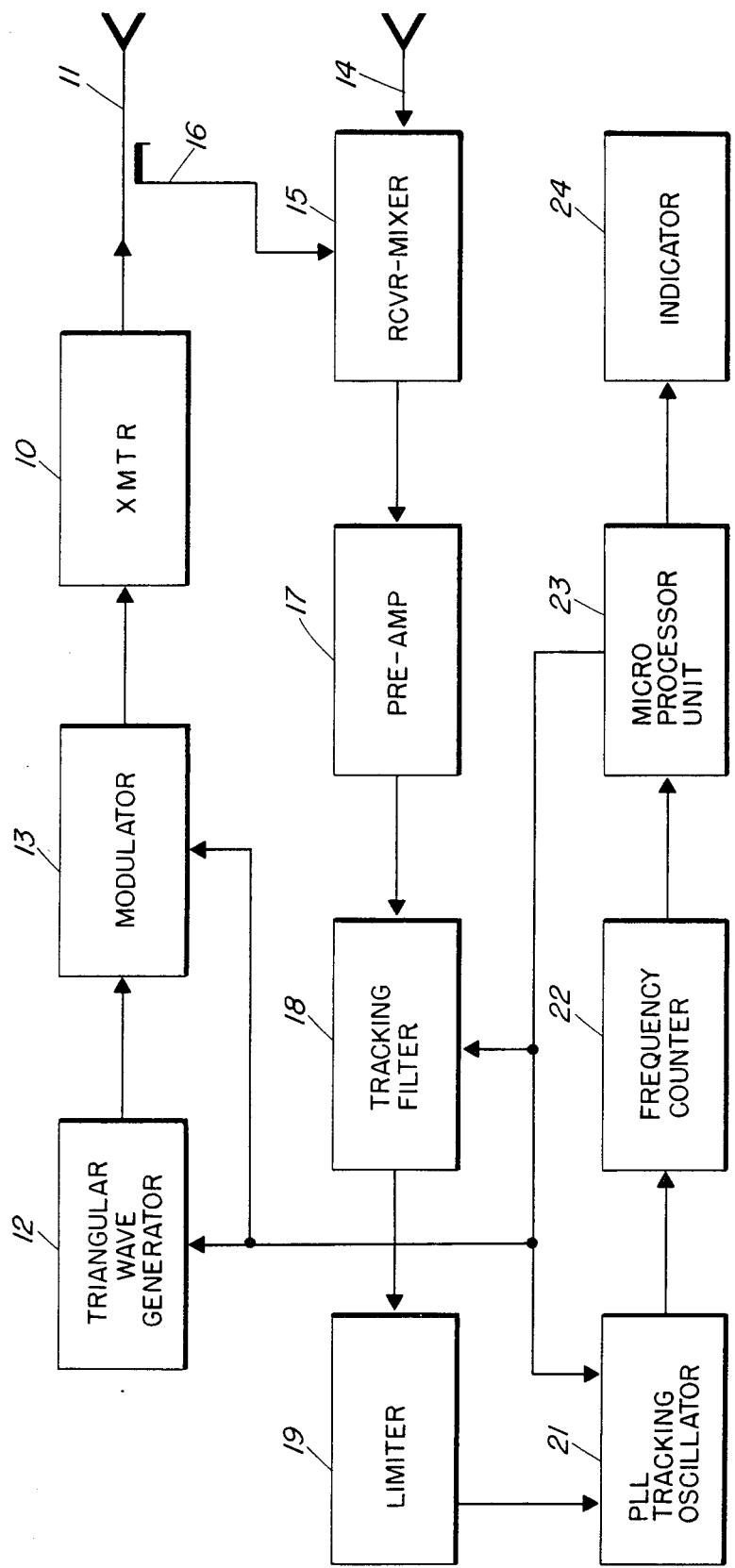
FIG. 1 is a functional block diagram of an FM/CW radio altimeter incorporating the present invention.

An FM/CW radio altimeter incorporating the phase locked loop tracking oscillator of the present invention is shown broadly in the block diagram of FIG. 1. A transmitter 10 supplies energy to an antenna 11 located in an aircraft to transmit a radio beam towards the earth. The transmitter 10 supplies a continuous wave signal which is linearly frequency modulated by the output of a triangular wave generator 12 applied to a modulator 13. Ground reflections of the transmitted beam are received by an antenna 14 and applied as one input to a receiver-mixer 15. A portion of the transmitted signal derived from coupler 16 is applied as a second input to mixer 15 and the output thereof, comprising a beat signal having a frequency equal to the difference between the instantanous frequencies of the transmitted and received signals, is amplified in a broad-banded preamplifier 17.

To assist in selecting the proper signal component for processing, preamplifier 17 is followed by a tracking filter 18 which is generally of the bandpass type intended to eliminate or reduce signal components at frequencies corresponding to altitudes above the probable altitude of the aircraft. Signals passed by filter 18 are amplitude limited in a limiter 19, then supplied as input to a phase locked loop tracking oscillator 21, which is the subject of the present invention. Tracking oscillator 21 is adapted to select the most prominent component from amongst the spectrum present at its input and to lock-on and follow that component, producing a single frequency signal at its output.

The frequency of the output signal from tracking oscillator 21 is determined in a frequency counter 22, data from which is arithmetically processed in a microprocessor unit (MPU) 23 to produce an altitude indication in digital format. The altitude information at the output of microprocessor unit 23 may be displayed visually by an indicator 24 or preserved in digital format for utilization elsewhere in the aircraft.

Improvements to the altimeter affording increased accuracy and reliability of operation are enabled by employing microprocessor 23 as an element of control in triangular wave generator 12, modulator 13 and tracking filter 18. These improvements are disclosed in the following references: "Means for Eliminating Step Errors in FM/CW Radio Altimeters", U.S. Pat. No. 4,435,708; "Linear Frequency Modulator for FM/CW Radio Altimeter", copending U.S. application Ser. No. 347,839 filed Feb. 11, 1982; and "Tracking Filter for Radio Altimeter", U.S. Pat. No. 4,427,981, all invented by C. S. Kyriakos, co-inventor herein.

Figure 2:
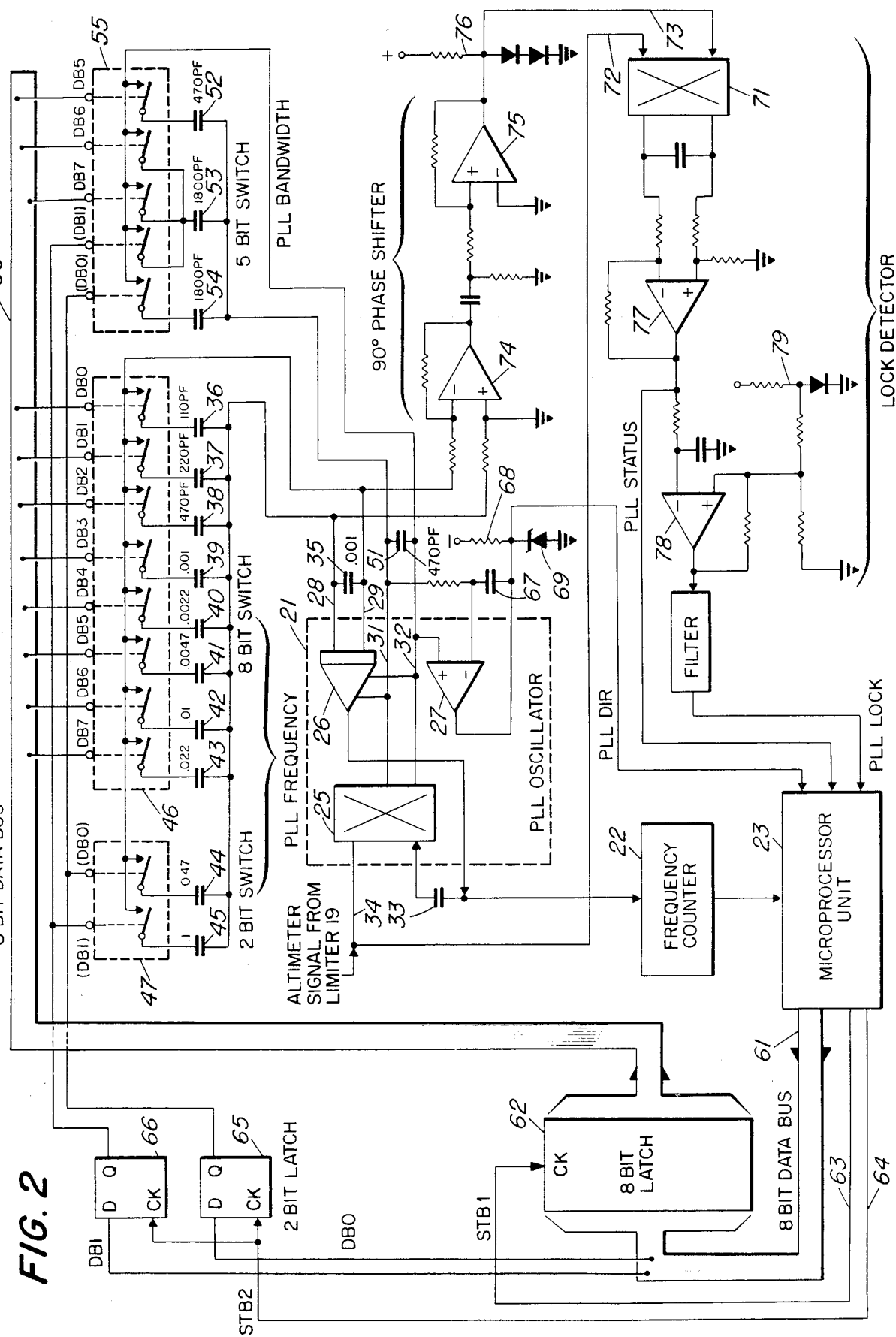
FIG. 2 is a composite schematic and functional block diagram of the phase locked loop oscillator of the invention.

A specific embodiment of the present invention incorporated in an altimeter having a range of 0-2500 ft. is illustrated in FIG. 2. This particular altimeter has a calibration constant of 80 Hz/ft. The operating range of the altimeter and its calibration constant imposes a range of operating frequencies on the tracking oscillator from about 1 kHz to greater than 200 kHz. The basic elements of phase locked loop (PLL) oscillator 21 comprising a phase comparator and error amplifier 25, a voltage controlled oscillator 26 and an operational amplifier 27 are available as a single integrated circuit unit from a variety of commercial sources. One specific integrated circuit suitable for use herein is the type XR-215 produced by Exar Integrated Systems, Sunnyvale, Calif. The natural frequency of voltage controlled oscillator (VCO) 26 is determined by the capacitance of one or more capacitors connected externally to the integrated circuit between leads 28 and 29. The error signal output of phase comparator 25 which controls adjustment of the frequency of VCO 26 appears between leads 31 and 32. The closed loop control of a PLL oscillator is capable of slewing the frequency of the VCO into alignment with the frequency of an applied signal when the applied signal frequency is within a certain limiting value known as the capture frequency $F_c$. Whenever the VCO becomes synchronized with an applied signal, the closed loop control will maintain the VCO frequency equal to the frequency of the applied signal until a certain limiting frequency known as the lock frequency $F_l$ is reached. The lock frequency range is greater than the capture frequency range. The capture frequency range is dependent in part upon the bandpass characteristic of a low-pass error signal filter formed as an integral part of phase comparator 25. The filter output is available externally to the integrated circuit on leads 31 and 32 enabling the filter bandpass to be varied by the connection of external capacitors between those leads. The output of VCO 26, which is also the output of PLL oscillator 21, is fed back through capacitor 33 as one input to phase comparator 25. The altitude signal output of limiter 19 (FIG. 1) is connected through lead 34 to the phase comparator 25 as the input signal to be tracked in frequency by PLL oscillator 21.

The natural frequency $F_o$ of VCO 26 varies with the value of the capacitor or capacitors connected between leads 28 and 29 approximately in accordance with the formula $F_o(Hz) = 200/C(mf)$. Capacitor 35, permanently connected between leads 28 and 29, establishes the maximum natural frequency of VCO 26. Lead 28 is extended as a common connection to capacitor 36-45. Lead 29 is extended as a common contact line to digital switches 46 and 47. As represented schematically, digital switches 46 and 47 selectively connect capacitors 36-45 between leads 28 and 29 according to the value of the switch input signals DB0-DB7, (DB0) and (DB1). Switches 46 and 47 employ negative logic so that a logic "1" input thereto results in an open switch connection, while logic "0" at the input results in a closed switch connection. Capacitor 35 has a value of 0.001 mf. Capacitors 36-45 which may be selectively connected in parallel with capacitor 35 by switches 46 and 47 have values ascending substantially in binary order from 110 pf to 0.1 mf. The minimum value of capacity connected between leads 28 and 29 is 0.001 mf resulting in a maximum $F_o$ for VCO 26 of approximately 200 kHz, while the maximum value of capacity connectable between leads 28 and 29 through closure of all contacts of switches 46 and 47 is 0.1887 mf, resulting in a minimum $F_o$ of 1 kHz.

The bandwidth of the error signal filter of phase comparator 25 is alterable by the connection of external capacitors between leads 31 and 32. The filter has the characteristics of a first order, low-pass RC filter in which R is constituted by the output impedance of phase comparator 25 and C is the external capacitance connected between leads 31 and 32. External capacitor 51, having a value of 470 pf is connected permanently between leads 31 and 32. External capacitors 52–54 are selectively connectable in parallel with capacitor 51 by means of a 5 bit digital switch 55. Switch 55, similar in construction to switches 46 and 47, receives logic signal inputs DB5–DB7 from an 8 bit data bus 56 which also supplies logic signal inputs DB0–DB7 to switch 46. Logic signal inputs (DB0) and (DB1) are supplied to switch 55 by separate data lines 57 and 58 which also supply logic signal inputs (DB0) and (DB1) to switch 47.

Logic signal inputs DB0–DB7 to switch 46 are set by data output from microprocessor unit 23 appearing momentarily on data bus 61. Data momentarily present on bus 61 is preserved on data bus 56 by an 8 bit latch 62 set by a strobe signal STB1 on line 63. Logic input signals (DB0) and (DB1) to switches 47 and 55 are determined by the value of data bits DB0 and DB1 present on data bus 61 at the time a strobe signal STB2 appears on line 64. Logic signals (DB0) and (DB1) are preserved on lines 57 and 58 by a 2 bit latch comprising D-type flip flops 65, 66 which are clocked by the strobe signal STB2 on line 64. It should be noted that logic signals (DB0) and (DB1) are independent of logic signals DB0 and DB1 latched onto data bus 56.

Adjustment of the VCO 26 natural frequency $F_o$ and bandwidth is made by switches 46, 47 and 55 in accordance with outputs by microprocessor unit 23 to data bus 61 which are obtained from a look-up table and adjusted, if necessary, by the microprocessor in the performance of subroutines, later to be described. The subroutines make use of condition signals PLL LOCK, PLL STATUS and PLL DIR. The PLL LOCK signal indicates by a logic "1" level that oscillator 21 has achieved frequency lock with the fundamental frequency of the altitude signal. The PLL STATUS signal is an analog signal the magnitude of which indicates the difference between the locked frequency at which oscillator 21 is operating and the natural frequency $F_o$ to which the oscillator is then adjusted. A logic "1" for the PLL DIR signal indicates that the locked frequency of oscillator 21 is below the natural frequency $F_o$ to which the oscillator is then adjusted, while logic "0" shows the opposite condition with the locked frequency higher than the natural frequency.

Figure 3:
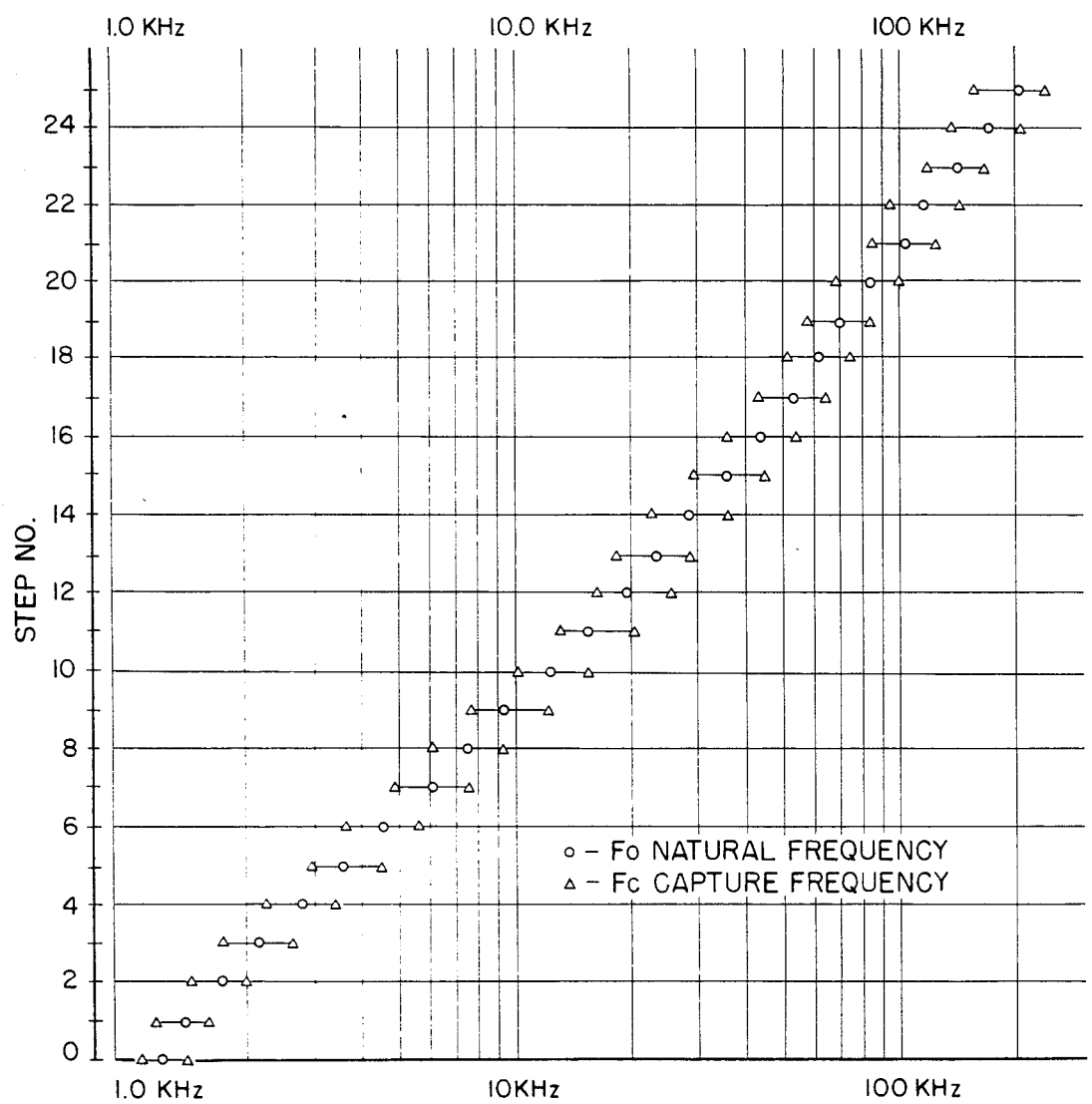
FIG. 3 is a chart showing the oscillator frequencies covered by the twenty-five coarse tuning steps of the digital control means.

PLL oscillator 21 is enabled to track the altitude signal from limiter 19 through a range of about 1 kHz through 200 kHz by programming the natural frequency of VCO 26 and the bandwidth of the error signal amplifier therefor in discrete steps covering the range of applied signal frequencies. FIG. 3 illustrates the natural frequency $F_o$ and the capture frequencies $F_c$ for 25 discrete adjustment steps covering the range of 1 kHz through 200 kHz. At each of these steps a particular combination of data signals, latched onto data bus 56 and data lines 57, 58, controls switches 46, 47 and 55 to insert a combination of capacitors 36–45 and 52–54 to produce the VCO natural frequency $F_o$ and capture frequencies $F_c$ shown for that step. The capture frequency range of each step of the program overlaps the capture frequency range of adjacent steps. The switch control data which determines the capacitor values for the 25 steps of FIG. 3 is contained in a 34 row look-up table stored in ROM of microprocessor unit 23. Data for steps 0 through 7 is contained in rows 0 through 15 of the table with the data for each step being duplicated in a succeeding row. That is, data for step zero is contained in rows 0 and 1 of the table, step 1 is contained in rows 2 and 3, etc. to step 7, which is contained in rows 14 and 15. Above step 7 data for each step is contained in a succeeding row of the table so that step 8 corresponds to row 16, step 9 corresponds to row 17, etc. through step 25, corresponding to row 33. In a subroutine of MPU 23, identified as PLLO, reference is initially made to the look-up table at the address for row 0, and the address is incremented for each successive program cycle or initially the look-up table is referred to at the address for row 33, corresponding to step 25 and the address is decremented for each successive program cycle until the condition signal PLL LOCK is received. The PLLO search routine is then exited and a subroutine, FOFT, is followed which causes fine adjustments to be made in the value of the VCO timing capacitors 36–45 to bring the VCO natural frequency $F_o$ more closely in alignment with the frequency of the altitude signal. The double entries of data for rows 0 through 15 of the look-up table are for the purpose of allowing additional time for the control loop to capture and stabilize the VCO frequency at the lower altitude signal frequencies. For altitude frequencies above about 8 kHz, the period of one program cycle, 25 ms., is adequate for the control loop of PLL oscillator to capture and stably lock on the applied frequency.

FIG. 4a is a plot of the error signal output of phase comparator 25 versus the phase difference between the input signal $F_i$ on lead 35 and the output signal of VCO 26 when the VCO is locked in synchronism with the input signal. When the frequency of the input signal is equal to the natural frequency of the VCO the error signal is zero and a 90° phase difference exists between the input signal and the VCO. When the VCO is locked to the input signal and the frequency of the input signal is below the natural frequency of the VCO, the error signal becomes increasingly positive with an increasing difference between $F_o$ and $F_i$ and the phase difference between the VCO signal and the input signal approaches zero. When the VCO is locked to the input signal and the frequency of the input signal is greater than the natural frequency of the VCO, the error signal becomes increasingly negative as the difference between the input signal frequency and the VCO natural frequency increases and the phase difference between the input signal and the VCO output approaches 180°. The polarity of the error signal from phase comparator 25 therefore provides an indication whether the input signal frequency is greater than or less than the VCO natural frequency.

The PLL DIR signal is generated from error signal output of phase comparator 25 in operational amplifier 27. Feedback capacitor 67 connected from the output of operational amplifier 27 to the inverting input thereof causes the operational amplifier to operate as an integrator, providing memory of limited duration of the error signal polarity. Biasing resistor 68 and zener diode 69 converts the variable amplitude output of amplifier 27 to logic "0" and "1" levels, depending on the polarity of the amplifier output.

The altitude signal from limiter 19 is of square waveform possessing a spectrum rich in odd harmonic and subharmonic components. The PLLO routine sweeps the frequency of VCO 26 from a value either above or below the fundamental frequency of the altitude signal towards the altitude signal frequency until the PLL LOCK condition signal is received. During the frequency sweep of the VCO, harmonics or subharmonics of the altitude signal frequency will be encountered prior to the fundamental altitude frequency. A harmonic component of sufficient magnitude can cause the PLL oscillator to capture and lock thereon. If the PLL oscillator frequency sweep is interrupted at this point, the computed altitude output of the altimeter will be grossly in error. The circuits for generating the PLL LOCK signal, next to be described, respond only when the PLL oscillator is locked to the fundamental of the altitude signal.

Again referring to FIG. 4a, the error signal variation is shown for the PLL oscillator locked to a frequency slightly greater or less than three times the natural frequency $F_o$ of the VCO. The error signal magnitude varies between the limits of $+V/3$ and $-V/3$, while the phase difference between the PLL oscillator output signal and the third harmonic of the applied signal varies between 60° and 120°. The relationship between error signal voltage and phase difference when the frequency of the applied signal is the third subharmonic of the VCO natural frequency is similar to that shown for the third harmonic.

FIG. 4b illustrates the result of comparing the phase of the applied altitude signal with the PLL oscillator output signal locked to the applied signal after shifting the phase of the PLL oscillator signal by 90°. When the PLL oscillator is locked to the fundamental of the applied signal the phase comparator output varies unidirectionally between a level of zero volts and $+V$ volts with the peak output occurring when the frequency of the applied signal is equal to the natural frequency of the VCO. The phase difference between the locked oscillator output signal and the applied signal varies between zero and 90° when the frequency of the applied signal is less than the VCO natural frequency and between 90° and 180° for applied signal frequencies greater than the VCO natural frequency. When the PLL oscillator is locked to the third harmonic or subharmonic of the applied signal the phase comparator output varies in similar fashion but with a peak output equal only to one-third of the value when the oscillator is locked to the applied signal fundamental. By threshold detecting the phase comparator output at a level $V_t$ which is greater than $V/3$, a PLL LOCK condition signal is generated which is immune to false responses caused by the locking of the PLL oscillator onto a harmonic or subharmonic of the applied signal.

Again, referring to FIG. 2, phase comparator 71 receives the altitude signal from limiter 19 on input 72 and a signal on input 73 which is equivalent to the output of PLL oscillator 21 shifted in phase by 90°. A 90° phase shift of the output of PLL oscillator 21, effective throughout the frequency range of the oscillator, is provided by a differential amplifier 74, the inputs to which are from inputs 28, 29 of VCO 26. Amplifier 74 is followed by a zero crossing detector 75 and limiter 76.

FIGS. 5A–5C illustrate the operation of the phase shifter. The output of VCO 26 is the square wave of FIG. 5A. The waveform of the voltage across the timing capacitors connected between leads 28 and 29 of VCO 26 is the triangular wave of FIG. 5B. The peaks of waveform 5B occur at the zero and 180° points of waveform 5A with the positive half of the triangular wave occupying the phase of 90°–270° of waveform 5A. At the 90° phase point of waveform 5A, waveform 5B transitions from negative to positive polarity, zero crossing detector 75 saturates at a positive level and remains so to the 270° point where the triangular wave again becomes negative. The positive output of detector 75 is limited in amplitude by limiter 76 to produce the waveform of FIG. 5C which constitutes the phase shifted PLL oscillator input to phase comparator 71.

The output of phase comparator 71, shown in FIG. 4B, is passed through a differential amplifier 77 to remove any common mode bias therein and is then threshold detected by amplifier 78 at a level $V_T$ set by network 79. The filtered output of detector 78 comprises the condition signal PLL LOCK which has a logic "1" value whenever the PLL oscillator 21 is locked to the fundamental frequency of the altitude signal.

The output of differential amplifier 77 comprises the condition signal PLL STATUS, which is analog in form and which has a magnitude inversely related to the difference between the frequency of the altitude signal and the natural frequency $F_o$ of VCO 26. PLL STATUS is used by MPU 23 in a subroutine FOFT, later described, to adjust the VCO natural frequency $F_o$ to values intermediate of the programmed values shown in FIG. 3 and the look-up table of FIG. 6.

Switches 46, 47 and 55 are controlled by the MPU 23 in accordance with the subroutines shown in the flow charts of FIGS. 7–9. Once during each program cycle of MPU 23 the SEARCH routine of FIG. 7 is called. This routine steps methodically through the 34 index positions of the look-up table of FIG. 6 to cause the PLL oscillator 21 to scan through the frequency range shown in FIG. 3. When a PLL LOCK condition is detected the FOFT subroutine is called to effect fine adjustments in the tuning of oscillator 21 so that the altitude signal frequency may be tracked smoothly without producing transient frequency variations by abrupt changes in the center frequency of the oscillator.

Referring to FIG. 7, when the SEARCH subroutine is called during the program cycle of MPU 23 the PLL LOCK condition signal is examined in decision block 110 to determine whether oscillator 21 is at that time locked to the altitude signal. Assuming that oscillator 21 is not locked, a register 100 of MPU 23 is incremented by instruction block 111. Register 100 is reserved for the purpose of counting the number of program cycles during which the PLL oscillator has not been locked. The value of the number contained in register 100 is tested in decision block 112 to determine whether it equals or exceeds 64. Initially, it may be assumed that the number contained by register 100 is greater than 64 so that instruction 113 is given to set register 100 equal to 64, followed by instruction 114 to set the No Computed Data (NCD) flag and instruction 115 to set the PLL unlocked flag. Then instruction 116 calls the PLLO subroutine of FIG. 8. Upon exiting from PLLO a subroutine DDUP is called, 117. The DDUP subroutine supplies valid data relating to the frequency of the altitude signal obtained and stored during a previous program cycle to the arithmetic unit of MPU 23. If the NCD data flag is not set the MPU follows an ALTC subroutine, 118, to compute and display altitude information from the altitude signal frequency data. On completion of ALTC the program returns to block 110 for repetition of the SEARCH subroutine during the next program cycle.

If oscillator 21 has been locked on the altitude signal and then loses lock, decision block 136, following decision block 112, determines whether four or more program cycles, up to and including sixty-three program cycles, have expired since lock was last achieved. If so, the PLL unlocked flag is set, 115 and PLLO is called. If the number of program cycles since oscillator 21 was last locked to the altitude signal is two or three, decision block 137 calls PLLO, 116, without setting the PLLO flag. If only one program cycle has expired, decision block 137 issues instruction 138 to store the PLL DIR condition signal before calling PLLO. Decision blocks 112, 136 and 137 permit the use of valid stored altitude signal frequency data for computation and display of altitude information if signal lock is temporarily lost but limit the use of such stored data to a period of sixty-three program cycles, approximately 1.5 seconds.

Referring to FIG. 8, when instruction 116 is given to call the PLLO subroutine, MPU 23 tests the PLL DIR condition signal at decision block 121 to determine the direction of adjustment to be made in the frequency of PLL oscillator 21. If oscillator 21 has not achieved frequency lock with the altitude signal the logic network 68, 69 (FIG. 2) sets the PLL DIR signal equal to logic "1". The left-hand branch from decision block 121 will then be followed. Instruction 122 is given to decrement a register 102 if MPU 23 reserved for the purpose of providing the row index at which entry is made to ROM containing data bits DB0–DB7, (DB0) and (DB1) of the look-up table in FIG. 6. Initially, register 102 may be assumed to contain some number greater than 33. Therefore, from decision block 123 instruction 124 is given to set register 102 equal to 33. The result is that the table of FIG. 6 will be entered at index 33, causing the search to begin at the high end of the frequency range of oscillator 21. The data of table 6 is contained in an ROM of MPU 23 at an offset address which is accessed by loading an accumulator of MPU 23 with the number contained by register 102 and adding a fixed number for the offset address, 125. Data bits DB0–DB1, (DB0) and (DB1) obtained at the offset address are loaded into a 10 bit capacity register 106 of the MPU 23 by instruction 126. Instruction 127 strobes the DB0–DB7 contents of register 106 into latch 62 and the (DB0) and (DB1) into latches 65 and 66, causing switches 46, 47 and 55 to be set at the values specified by the table of FIG. 6. The PLLO subroutine is then exited for resumption of SEARCH.

Returning to block 121, if the PLL DIR signal is at logic "0" when the PLLO subroutine is entered, the right-hand branch from block 121 is followed. Instruction 128 is given to increment index register 102. At decision block 129, if the number contained by register 102 is less than 33, instruction 125 is given, followed by instructions 126, 127 and exit. The result is that switches 46, 47 and 55 will be set to the values listed at the index row next higher in order than the existing setting. If register 102 contains the number 33 at the time increment instruction 128 is given, decision block 129 issues instruction 131 causing register 102 to be reset to zero, the lowest frequency setting for oscillator 21. Adjustments in the frequency of oscillator 21 then proceed from the low frequency setting towards the high end of the frequency range.

Again referring to FIG. 7, if test of the PLL LOCK condition signal in block 110 indicates that oscillator 21 has achieved frequency lock with the altitude signal, the output of a signal to noise detector for the altitude signal (not shown) is tested in block 133 to confirm the validity of the PLL LOCK signal. If good signal strength is indicated instructions 134 are given to reset unlocked cycle count register 100, to reset the NCD flag and to reset the PLL unlocked flag. The FOFT subroutine is then called, 135, to fine tune the natural frequency $F_o$ of oscillator 21 to a value intermediate of the value of the index row of FIG. 6 selected by PLLO and the value of the next higher or lower index row.

Referring to FIG. 9, upon entry into the FOFT subroutine decision block 140 determines whether the number contained by index register 102 is equal to or greater than 16. If the number contained by register 102 is equal to 16 or greater, instruction 142 is given to set register 104 equal to 1. If the number in register 102 is less than 16 instructions 141 are given to load an accumulator with the number contained by register 102; to complement the number, to mask the four most significant bits of the complemented number; to increment the complement and to load a register 104 with the result. This operation, as will later be seen, permits the 10 bit data number controlling switches 46, 47 and 55 to be incremented or decremented 16-n times, where n is the table row index contained by register 102, each program cycle. The difference between the data outputs for adjacent table index rows below 16 is considerably larger than such difference above index row 16. The operation of instruction block 141 therefore tends to equalize the fine tuning scan rates at low and at high frequencies.

After register 104 is set either to 1 by instruction 142 or to 15 or less by instruction 141 a subroutine 143 is called. The subroutine 143, not described in detail herein, has the purpose of converting the analog condition signal PLL STATUS to digital. Referring to FIG. 4B, PLL STATUS varies according to the function labeled "Fundamental" with a peak value of 4.0 volts. The conversion scale is 0.4 v.=1. If the magnitude of PLL STATUS is greater than a threshold of 2.52 v. the adjustment of the natural frequency $F_o$ oscillator 21 is deemed to be sufficiently close to the frequency of the altitude signal as not to require adjustment. Subroutine 143 determines whether PLL STATUS is within such a tolerance by subtracting the digital equivalent of 2.52 v., using 2's complement, from the digital equivalent of PLL STATUS. The subtraction generates a carry=1 if the magnitude of PLL STATUS is equal to or greater than 2.52 v.

At the conclusion of subroutine 143 decision block 144 determines whether a carry has been generated. If so, FOFT is exited and SEARCH is rejoined at instruction 118. If no carry has been generated decision block 145 tests the condition signal PLL DIR to determine whether the frequency $F_o$ of oscillator 21 requires increasing or decreasing. If $F_o$ is to be increased instruction 146 is given to increment data register 106. Then an accumulator is loaded with the number contained by register 102 and incremented, 147, so that the accumulator will point to the index row of FIG. 6 next higher than the index row at which oscillator 21 is then adjusted. Data from the table pointed to by the accumulator is retrieved by adding the table offset address, 148, and loaded into a register 108 for temporary storage, 149. The contents of data register 106 are compared for equality with those of register 108 in decision block 151. If the contents of registers 106 and 108 are equal instruction 152 is given to replace the contents of index register 102 with the accumulator contents, less the offset address added by instruction 148. Register 104, containing a number from 1 to 15 as determined by instructions 141 or 142, is decremented, 153 and tested for equality to zero in decision block 154. If register 104 does not equal 0, return is made to decision block 145 and steps 146-154 are repeated until the register 104 contents are equal to 0. At that time instruction 155 is given to output the contents of data register 106 to latches 62, 65 and 66 and the subroutine is exited to rejoin SEARCH at instruction 118.

If at decision block 145 PLL DIR indicates that $F_o$ requires reduction the process is similar to that described for increasing $F_o$ except that instructions 156 and 157 result in decrementing the contents of data register 106 and in comparing the decremented contents of register 106 with the data contained at the next lower index row of FIG. 6 from that at which oscillator 21 is then adjusted.

The invention claimed is:

1. A wideband phase locked loop tracking oscillator for use in an FM/CW radio altimeter, comprising
   a phase locked loop including a voltage controlled oscillator, a phase comparator for comparing the phase of the output of said voltage controlled oscillator with the phase of an altitude signal to be tracked in frequency and an error signal amplifier for applying the output of said phase comparator to said voltage controlled oscillator to vary the frequency thereof, said voltage controlled oscillator including circuit means having an input terminal and a timing capacitor connected to said input terminal, the natural frequency of said voltage controlled oscillator being dependent upon the capacitance of said timing capacitor;
   means applying an altitude signal to said phase comparator;
   a microprocessor unit;
   a plurality of capacitors;
   digital switch means for connecting combinations of said capacitors to said input terminal of said voltage controlled oscillator to determine the natural frequency thereof; said digital switch means being responsive to digital control signal outputs from said microprocessor; and
   means for detecting a phase lock condition between the output of said voltage controlled oscillator and the altitude signal applied to said phase comparator;
   said microprocessor having stored therein in table form a plurality of sets of digital control signals for said switch means, each said set being adapted to determine a discrete natural frequency for said voltage controlled oscillator, said sets being arranged to provide a span of said natural frequencies covering the useful range of frequencies of said altitude signal;
   said microprocessor being programmed to apply said digital control signals to said switch means set by set sequentially until said phase lock detecting means indicates the existence of said phase lock condition.

2. A tracking oscillator as claimed in claim 1 with additionally,
   means providing a directional signal indicating whether the natural frequency of said voltage controlled oscillator must be increased or decreased in order to equal the frequency of said altitude signal and wherein said microprocessor is responsive to said directional signal to apply said sets of digital signals in sequence to increase or to decrease said voltage controlled oscillator natural frequency in conformity with said directional signal.

3. A tracking oscillator as claimed in claim 2 and wherein said microprocessor is further responsive to said directional signal to increment or decrement digital signals of one said set to increase or to decrease said voltage controlled oscillator natural frequency in conformity with said directional signal.

4. A tracking oscillator as claimed in claim 3, with additionally, means providing a status signal having a magnitude related to the difference between the natural frequency of said voltage controlled oscillator and the frequency of said altitude signal when said voltage controlled oscillator is in a phase lock condition with said altitude signal;
   said microprocessor being responsive to said status signal to increment or decrement, in conformity with said directional signal, digital control signals of said one set whenever said status signal magnitude exceeds a predetermined level.

5. A tracking oscillator as claimed in claim 4 wherein said means providing a status signal comprises,
   means for shifting the phase of said output signal from said voltage controlled oscillator of said phase locked loop; and
   a second phase comparator for comparing the phase of output from said phase shift means with the phase of said altitude signal.

6. A tracking oscillator as claimed in claim 5 wherein said circuit means of said voltage controlled oscillator are operative to generate a periodic signal of triangular waveform at said input terminal thereof and said voltage controlled oscillator output signal is of square waveform and wherein said means for shifting the phase of said voltage controlled oscillator output signal comprises,
   a zero crossing detector for detecting transitions of said triangular waveform from one polarity to the opposite polarity and for generating a square wave output synchronized in the transitions between high and low levels thereof with the zero crossings of said triangular wave.

7. A tracking oscillator as claimed in claim 1 wherein said means for detecting a phase lock condition comprises,
   means for shifting the phase of said output signal from said voltage controlled oscillator an amount equal to one-quarter cycle of said output signal;
   second phase comparing means for comparing the phase of the output of said phase shifting means with said altitude signal; and
   a threshold detector for detecting an output signal level from said second phase comparing means exceeding a fixed threshold, said fixed threshold being greater than the maximum output level of said second phase comparing means whenever the frequency of said altitude signal is equal to any harmonic or sub-harmonic of said voltage conrolled oscillator natural frequency.

8. A tracking oscillator for use in an FM/CW radio altimeter, comprising
   a phase locked loop including a voltage controlled oscillator, a phase comparator for comparing the phase of the output of said voltage controlled oscillator with the phase of an altitude signal to be tracked in frequency and an error signal amplifier for applying the output of said phase comparator to said voltage controlled oscillator to vary the frequency thereof, said voltage controlled oscillator having a terminal and a timing capacitor connected to said terminal for determining the natural frequency of said voltage controlled oscillator, said error signal amplifier having a terminal and a bandwidth capacitor connected to said terminal for determining the bandwidth of said error signal amplifier;

a first plurality of capacitors;

first digital switch means responsive to first digital control signals for connecting combinations of capacitors of said first plurality in circuit with said timing capacitor to vary the natural frequency of said voltage controlled oscillator, each said combination of capacitors being determined by a particular value of said first digital control signal;

a second plurality of capacitors;

second digital switch means responsive to second digital control signals for connecting combinations of capacitors of said second plurality in circuit with said bandwidth capacitor to vary the bandwidth of said error signal amplifier;

means applying an altitude signal to said phase comparator;

a microprocessor unit;

said microprocessor having stored therein in look-up table form a plurality of sets of digital control signals, each said set including said first digital control signals for said first digital switch means and said second digital control signals for said second digital switch means, said sets being arranged to provide a sequence of values for said natural frequency of said voltage controlled oscillator spaced through the useful operating range of the altitude signal and to provide a bandwidth value for said error signal amplifier whereby the capture frequencies for said phase locked loop for adjacent pairs of said sets include common values of frequency;

said microprocessor being programmed to access said look-up table to select sequential sets of said digital control signals and to apply said selected sets of said digital control signals to said first and second digital switch means; and means for detecting a phase lock condition between the output of said voltage controlled oscillator and said altitude signal, said microprocessor being responsive to output of said phase lock detecting means to halt sequencing said digital control signals at a set of said signals producing said phase lock condition.

9. A tracking oscillator as claimed in claim 8 wherein said look-up table contains duplicated sets of said digital control signals for sets of said control signals corresponding to lower values of natural frequency of said voltage controlled oscillator.

10. A tracking oscillator as claimed in claim 8, with additionally, means providing a direction signal indicating whether the natural frequency of said voltage controlled oscillator is greater or less than the frequency of said altitude signal, said microprocessor being responsive to said direction signal to access, in conformity with said direction signal, sets of said digital control signals in said look-up table in sequence corresponding to increasing or to decreasing values of natural frequency of said voltage controlled oscillator.

11. A tracking oscillator as claimed in claim 10, with additionally, means providing to said microprocessor a status signal having a magnitude related to the difference between the absolute values of the natural frequency of said voltage controlled oscillator and the frequency of said altitude signal;

said microprocessor being further programmed to store therein separately from said look-up table the digital control signals of the set of said signals applied to said first and second switch means when phase lock is detected;

said microprocessor being responsive to a magnitude of said status signal above a predetermined threshold level to increment or to decrement, in conformity with said direction signal, said separately stored digital control signals, said digital control signals being incremented or decremented until the magnitude of said status signal is reduced below said predetermined threshold, said incremented or decremented digital control signals being applied by said microprocessor to said first and second switch means.

12. A tracking oscillator as claimed in claim 11 wherein said means providing a status signal includes means for shifting the phase of output from said voltage controlled oscillator, and a second phase comparator for comparing the phase of output of said phase shifter with said altitude signal.

13. A tracking oscillator as claimed in claim 12 wherein said second phase comparator provides an analog output signal and wherein said means for detecting a phase lock condition includes, a threshold detector providing a digital output indicating said phase lock condition whenever said analog output signal exceeds a predetermined threshold.

* * * * *